US010169132B2

(12) United States Patent
Eggen et al.

(10) Patent No.: US 10,169,132 B2
(45) Date of Patent: *Jan. 1, 2019

(54) PREDICTING A LIKELIHOOD OF A CRITICAL STORAGE PROBLEM

(71) Applicant: International Business Machines Corporation, Armonk, NY (US)

(72) Inventors: Bertus Eggen, Cologne (DE); John F. Hollingsworth, Wynnewood, PA (US); Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/074,133

(22) Filed: Mar. 18, 2016

(65) Prior Publication Data

US 2016/0203038 A1  Jul. 14, 2016

Related U.S. Application Data

(63) Continuation of application No. 14/326,546, filed on Jul. 9, 2014, now Pat. No. 9,354,956.

(51) Int. Cl.
*G06F 11/07* (2006.01)

(52) U.S. Cl.
CPC ........ *G06F 11/079* (2013.01); *G06F 11/0727* (2013.01); *G06F 11/0751* (2013.01); *G06F 11/0754* (2013.01)

(58) Field of Classification Search
CPC ............. G06F 11/0754; G06F 11/0727; G06F 11/079; G06F 11/0751; G06F 11/008;

(Continued)

(56) References Cited

U.S. PATENT DOCUMENTS

| | | | | |
|---|---|---|---|---|
| 7,143,046 B2* | 11/2006 | Babu | .......... | H03M 7/30 |
| | | | | 704/500 |
| 7,912,815 B1* | 3/2011 | Snoot | .......... | G06F 11/008 |
| | | | | 707/659 |

(Continued)

OTHER PUBLICATIONS

Yang et al., Design and implementation of a workflow-based resource broker with information system on computational grids, Published online: Apr. 12, 2008, copyright Springer Science+ Business Media, LLC 2008, J. Supercomput (2009) 47:pp. 76-109, DOI 10.1007/s11227-008-0201-5.

(Continued)

*Primary Examiner* — Nadeem Iqbal
(74) *Attorney, Agent, or Firm* — Schmeiser, Olsen & Watts, LLP; Michael Petrocelli

(57) ABSTRACT

A method and associated systems for a resource-utilization monitor with self-adjusting sample size. A processor monitors availability of a resource-limited entity by analyzing a set of samples that each identify, at the time the sample was recorded, an unused amount of resource available to the entity. The processor computes a Chi-square statistic of the sample set. If the statistic reveals that the number of samples in the sample set is too small to produce valid results, the processor adjusts the sample size to specify a larger number of samples and repeats these steps. If the number of samples is large enough to produce statistically valid results, the processor analyzes the sample set to determine whether the current amount of remaining resource is undesirably low, is likely to become undesirably low during a short-term period of time, or is likely to become undesirably low during a longer-term period of time.

22 Claims, 3 Drawing Sheets

(58) Field of Classification Search
CPC .. G06F 11/0793; G06F 11/073; H04L 41/069; H04L 41/0681; H04L 41/5054; H04L 41/142
See application file for complete search history.

(56) References Cited

U.S. PATENT DOCUMENTS

| | | | |
|---|---|---|---|
| 8,069,012 B2* | 11/2011 | Chan | G06Q 30/02 702/181 |
| 8,352,790 B2* | 1/2013 | Nakagawa | G06F 11/0709 709/223 |
| 9,354,956 B2* | 5/2016 | Eggen | G06F 11/0754 |
| 2008/0270674 A1 | 10/2008 | Ginzton | |
| 2009/0306933 A1* | 12/2009 | Chan | G06Q 30/02 702/181 |
| 2011/0252134 A1* | 10/2011 | Villeneuve | G06F 17/30398 709/224 |

OTHER PUBLICATIONS

Steve Strutt, Redbooks paper, Best Practices for Storage Infrastructure Availability Management, copyright IBM Corp. 2004, 16 pages.
IBM, AIX Storage Management, Document No. GG24-4484-00, Oct. 24, 1994, 392 pages.
Office Action (dated Jan. 26, 2016) for U.S. Appl. No. 14/326,546, filed Jul. 9, 2014, Conf. No. 2810.
Office Action (dated Jan. 28, 2016) for U.S. Appl. No. 14/326,546, filed Jul. 9, 2014, Conf. No. 2810.
Notice of Allowance (dated Mar. 8, 2016) for U.S. Appl. No. 14/326,546, filed Jul. 9, 2014, Conf. No. 2810.

* cited by examiner

US 10,169,132 B2

PREDICTING A LIKELIHOOD OF A CRITICAL STORAGE PROBLEM

This application is a continuation application claiming priority to Ser. No. 14/326,546, filed Jul. 9, 2014, now U.S. Pat. No. 9,354,956, issued May 31, 2016.

TECHNICAL FIELD

The present invention relates to monitoring available capacity of a resource-consuming device in order to more accurately forecast error conditions.

BACKGROUND

When available capacity of a storage device or other limited-capacity entity drops below a threshold value, quick response can be essential in order to avoid performance degradation or a catastrophic failure of an application or hardware device that depends upon the availability of sufficient capacity. It is thus important to be able to predict overutilization of such a limited-capacity entity before it is too late to prevent or mitigate such a problem or failure.

Such prediction can be difficult, however, because an amount of free space of a storage unit can change abruptly, with a degree of randomness, or in an other way that is not easily predictable as a function of current utilization.

BRIEF SUMMARY

A first embodiment of the present invention provides a method for a resource-utilization monitor, the method comprising:

a processor of a computer system receiving a sample set, wherein a sample size identifies a number of samples in the sample set, and wherein a first sample of the sample set identifies a first amount of storage space that was available to a storage device at a time when the first sample was recorded;

the processor determining whether the sample set is statistically valid; and the processor performing a statistical analysis of the sample set that indicates a likelihood that the amount of storage space available to the storage device will reach a critical level at or before a threshold time, wherein the threshold time is selected from a group comprising: the time of the performing, a short-term prediction time that occurs after the performing, and a long-term prediction time that occurs after the short-term prediction time.

A second embodiment of the present invention provides a computer program product, comprising a computer-readable hardware storage device having a computer-readable program code stored therein, said program code configured to be executed by a processor of a computer system to implement a method for a resource-utilization monitor, the method comprising:

the processor receiving a sample set, wherein a sample size identifies a number of samples in the sample set, and wherein a first sample of the sample set identifies a first amount of storage space that was available to a storage device at a time when the first sample was recorded;

the processor determining whether the sample set is statistically valid; and the processor performing a statistical analysis of the sample set that indicates a likelihood that the amount of storage space available to the storage device will reach a critical level at or before a threshold time, wherein the threshold time is selected from a group comprising: the time of the performing, a short-term prediction time that occurs after the performing, and a long-term prediction time that occurs after the short-term prediction time.

A third embodiment of the present invention provides a computer system comprising a processor, a memory coupled to said processor, and a computer-readable hardware storage device coupled to said processor, said storage device containing program code configured to be run by said processor via the memory to implement a method for a resource-utilization monitor, the method comprising:

the processor receiving a sample set, wherein a sample size identifies a number of samples in the sample set, and wherein a first sample of the sample set identifies a first amount of storage space that was available to a storage device at a time when the first sample was recorded;

the processor determining whether the sample set is statistically valid; and the processor performing a statistical analysis of the sample set that indicates a likelihood that the amount of storage space available to the storage device will reach a critical level at or before a threshold time, wherein the threshold time is selected from a group comprising: the time of the performing, a short-term prediction time that occurs after the performing, and a long-term prediction time that occurs after the short-term prediction time.

DETAILED DESCRIPTION

Figure 1:
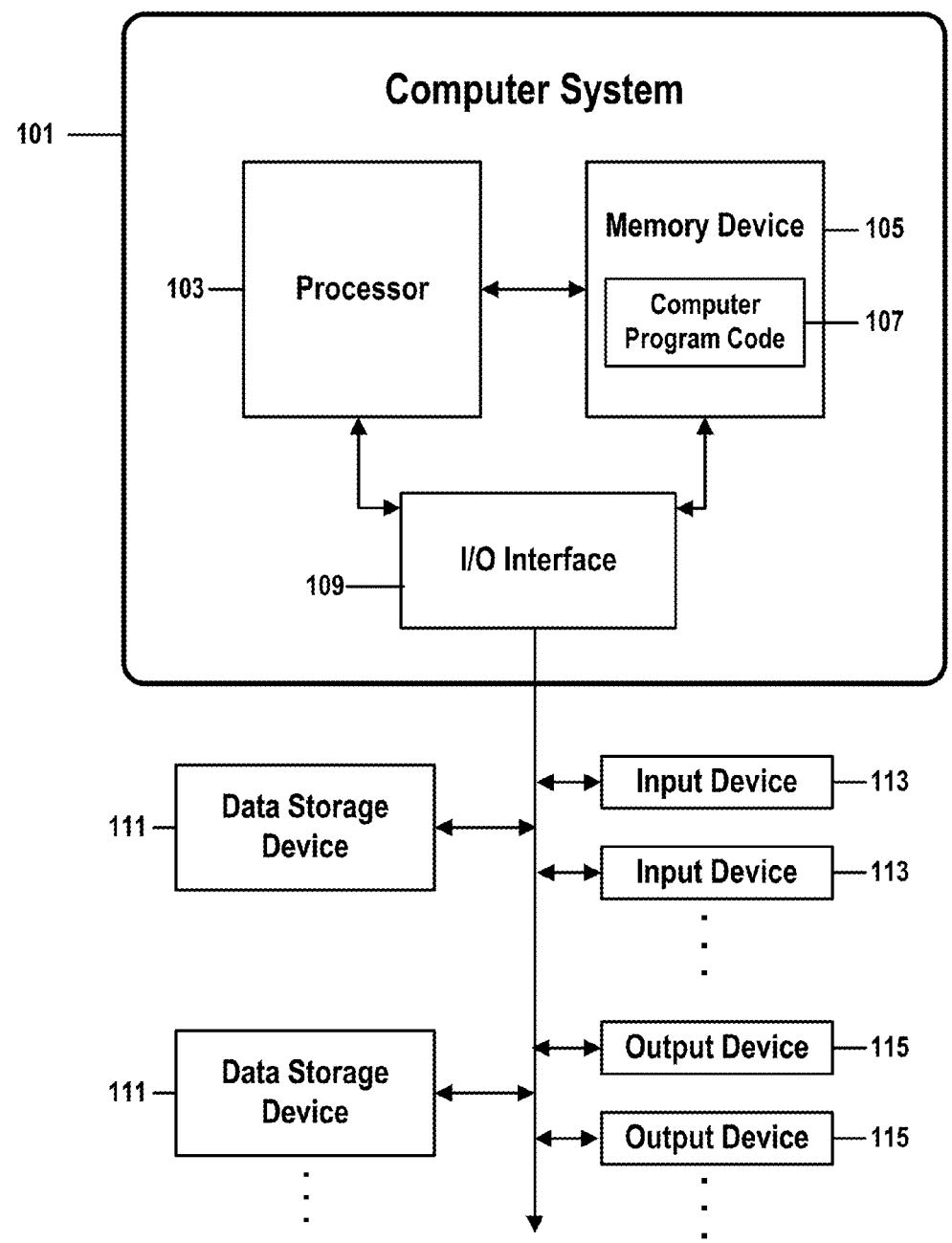
FIG. 1 shows the structure of a computer system and computer program code that can be used to implement a method for resource-utilization monitor with self-adjusting sample size in accordance with embodiments of the present invention.

A processor of a computer system can automatically monitor an amount of available capacity of a resource of a limited-capacity entity, such as a storage capacity of a storage device, a processing power of a computer processor, an amount of contiguous memory of a computer random-access memory, a physical resource of a platform of a cloud-computing or other type of virtualized computing environment, a bandwidth of a computer network or other type of bandwidth-limited communications medium, a port utilization of an electronic switch, a traffic-handling capacity of a highway or freeway, or a storage capacity of a fuel tank.

This monitoring can be performed by a variety of means known to those skilled in the art, such as electronically sampling or querying a characteristic of the device or by sampling or querying an entity associated with the device, such as a system-logging mechanism, a device interface, or a device controller. If automated, this monitoring can be performed by the processor at predetermined times or at fixed or variable intervals.

In some cases, future utilization of the device can be inferred as a function of past or present utilization. Such inferences, however, can not accurately predict a future overutilization condition. This can occur when a utilization pattern is a function of a random or pseudorandom factor or is subject to abrupt changes. Monitoring could, for example, reveal that a hard drive's available capacity has varied over the last week between 55% and 60%. However, a current installation of a transaction-processing system can suddenly consume an additional 35% of the disk's storage, thus generating an unexpected overutilization condition.

A monitoring mechanism can be more effective in such implementations if it is based on a statistical method that analyzes a sample set that comprises samples of performance data previously collected by a monitoring mechanism in order to predict, within a specified confidence threshold, an acceptable probability that no overutilization will occur within a particular time frame.

The validity of such a statistical method can be a function of a sample size that identifies a number of distinct samples comprised by the sample set being analyzed. If sampled utilization statistics show a higher rate of variability, for example, a larger sample size will be needed in order to filter out noisy data resulting from this variability. It can also be desirable to select a smallest sample size that will produce statistically valid results because a larger sample size can consume more resources, require more frequent sampling, produce less-timely results, or fail to identify a critical short-term trend or event.

Embodiments of the present invention can continuously adjust sample size by means of a feedback mechanism. This mechanism can use statistical methods to forecast a likelihood of an overutilization condition that can directly or indirectly affect a choice of an optimal sample size. Such embodiments, while analyzing each collected sample set in order to identify a likelihood of a current or future overutilization condition, continuously adjust the sample size (that is, the number of collected samples comprised by each analyzed sample set), based on a function of each such analysis.

Here, the term "storage device" refers to a device that is characterized by a fixed or variable amount of storage capacity that allows data to be stored in the device and later retrieved. Examples of such a storage device comprise, but are not limited to, a hard disk drive, a solid-state storage device, a virtual disk drive of a virtual-computing or cloud-computing environment, a mobile device like a cell phone or tablet, or an other electronic component equipped with such a storage device.

Embodiments of the present invention described herein as monitoring storage capacity of a storage device cannot monitor storage capacity of a network connection, a wireless communications medium, or of an other entity that can transmit information, but cannot store information on a medium from which the information can be later retrieved. These embodiments do not limit other embodiments of the present invention to monitoring storage capacity of a storage device, and other embodiments can be configured to monitor utilization of any limited resource, such as a CPU's processor power, a network backbone's bandwidth, or a fuel capacity of a fuel tank. An embodiment that monitors a resource associated with an entity that can transmit or carry, but not store, information, such as a bandwidth of a virtual network or of a wireless communications interface, would not, however, attempt to monitor a non-existent storage capacity of such an entity.

FIG. 1 shows a structure of a computer system and computer program code that can be used to implement a method for resource-utilization monitor with self-adjusting sample size in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 can include, but are not limited to, magnetic tape drives, fixed or removable hard disks, optical discs, storage-equipped mobile devices, and solid-state random-access or read-only storage devices. I/O devices can comprise, but are not limited to: input devices 113, such as keyboards, scanners, handheld telecommunications devices, touch-sensitive displays, tablets, biometric readers, joysticks, trackballs, or computer mice; and output devices 115, which can comprise, but are not limited to printers, plotters, tablets, mobile telephones, displays, or sound-producing devices. Data storage devices 111, input devices 113, and output devices 115 can be located either locally or at remote sites from which they are connected to I/O Interface 109 through a network interface.

Processor 103 can also be connected to one or more memory devices 105, which can include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for resource-utilization monitor with self-adjusting sample size in accordance with embodiments of the present invention, and can implement other embodiments described in this specification, including the methods illustrated in FIGS. 1-3. The data storage devices 111 can store the computer program code 107. Computer program code 107 stored in the storage devices 111 is configured to be executed by processor 103 via the memory devices 105. Processor 103 executes the stored computer program code 107.

Thus the present invention discloses a process for supporting computer infrastructure, integrating, hosting, maintaining, and deploying computer-readable code into the computer system 101, wherein the code in combination with the computer system 101 is capable of performing a method for resource-utilization monitor with self-adjusting sample size.

Any of the components of the present invention could be created, integrated, hosted, maintained, deployed, managed, serviced, supported, etc. by a service provider who offers to facilitate a method for resource-utilization monitor with self-adjusting sample size. Thus the present invention discloses a process for deploying or integrating computing infrastructure, comprising integrating computer-readable code into the computer system 101, wherein the code in combination with the computer system 101 is capable of performing a method for resource-utilization monitor with self-adjusting sample size.

One or more data storage units 111 (or one or more additional memory devices not shown in FIG. 1) can be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 can comprise said computer-readable hardware storage device.

While it is understood that program code 107 for a resource-utilization monitor with self-adjusting sample size can be deployed by manually loading the program code 107 directly into client, server, and proxy computers (not shown) by loading the program code 107 into a computer-readable storage medium (e.g., computer data storage device 111), program code 107 can also be automatically or semi-automatically deployed into computer system 101 by sending program code 107 to a central server (e.g., computer system 101) or to a group of central servers. Program code 107 can then be downloaded into client computers (not shown) that will execute program code 107.

Alternatively, program code 107 can be sent directly to the client computer via e-mail. Program code 107 can then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a resource-utilization monitor with self-adjusting sample size is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by the program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention can be implemented as a method performed by a processor of a computer system, as a computer program product, as a computer system, or as a processor-performed process or service for supporting computer infrastructure.

Figure 2:
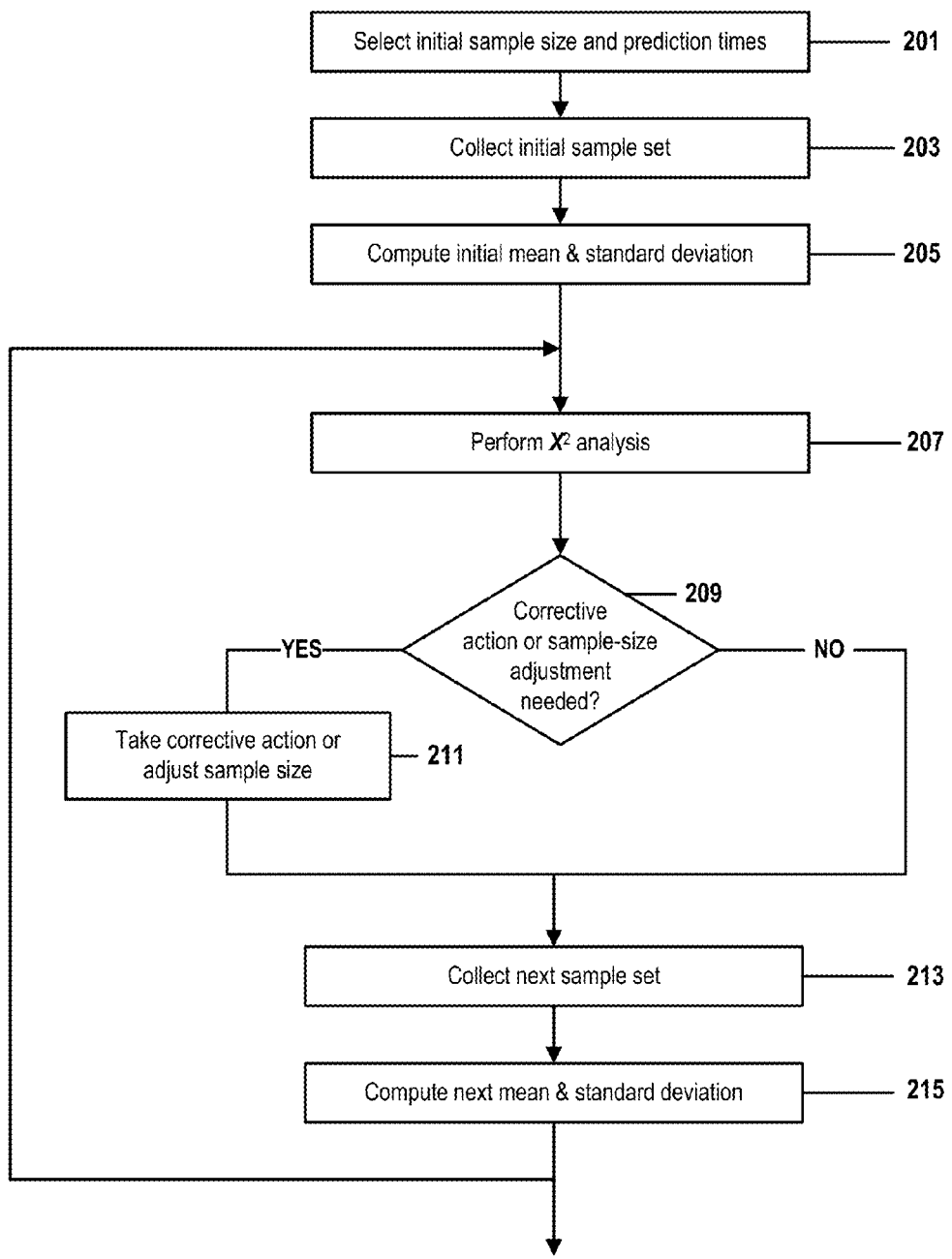
FIG. 2 is a flow chart that illustrates a method for a resource-utilization monitor with self-adjusting sample size in accordance with embodiments of the present invention.

FIG. 2 is a flow chart that illustrates a method for a resource-utilization monitor with self-adjusting sample size in accordance with embodiments of the present invention. FIG. 2 shows elements identified by reference numbers 201-215.

Although the description below of FIG. 2 refers generally to a "storage device," embodiments of the present invention can be applied to any sort of entity that is associated with a limited-capacity resource, as described above.

In step 201, the one or more processors identify an initial value of a sample size. Here, a sample size identifies a number of samples of a parameter being monitored that are comprised by a sample set. A sample might, for example, identify an amount of available capacity of a disk drive, an amount of available capacity of a computer's RAM memory, or an amount of available bandwidth of a computer network backbone. In the first of these examples, a first sample set can comprise a series of measurements of the disk drive's available capacity, wherein the number of sampled disk-capacity measurements comprised by the first sample set is identified as the sample size of that sample set.

A number of the samples comprised by a sample set (the aforementioned "sample size" of the sample set) can be determined as a function of implementation-dependent factors. Determining how many samples are needed to provide statistically relevant results can be chosen through a trial-and-error procedure, as a function of records of past performance, or as a function of expert knowledge about a characteristic of the storage device, its operating environment, its past pattern of utilization, its users, or an other relevant entity.

In one example, in which the one or more processors monitor an amount of available storage capacity of a rewritable optical drive, it can make sense to set an initial sample size to a value of 100, 500, 1000, or 2000 in order to obtain enough samples to produce statistically meaningful results. A sample size of three samples, however, can be insufficient to produce reliable output and a sample set comprising eight million samples can require a prohibitively long collection time to collect or impose an unnecessary burden on system resources.

A larger number of samples can provide results that have more statistical significance, but if accumulated over a longer period of time, that sample set can not as accurately identify recent performance characteristics. As with the initial sample size, the frequency at which samples are collected and the duration of time (e.g., time "I") between performances of the analytical method of FIG. 3, can be identified by means known to those skilled in the art, or can be determined as a function of expert knowledge or of some other relevant characteristic of the storage device, of its platform, or of an entity associated with the device.

A number of samples identified by a sample size can thus be chosen in order to balance a resource consumption of a monitoring mechanism against an effectiveness of the monitoring mechanism. Embodiments of the present invention work by accumulating a sample set, performing a statistical analysis of the data comprised by the sample set, and then using a result of that analysis to forecast overutilization problems. Because a larger sample set can require more time to accumulate, a sample size that is too large can compromise the timeliness of an embodiment by delaying the statistical analysis step of the embodiment. Such a compromised embodiment can fail to alert an administrator of an impending overutilization or overcapacity condition quickly enough to prevent or mitigate a resulting problem.

Conversely, a sample size that is too small can compromise the accuracy or effectiveness of an embodiment of the present invention. Because methods of the present invention comprise steps of statistical analysis, such steps will produce more accurate results when a larger amount of data is available for analysis. As is known to those skilled in the art of statistics, a confidence threshold, or a probability that an expected result will occur, generally increases monotonically with a sample size. And if a sample size falls below a certain threshold, it can be impossible to forecast an outcome with a desired level of confidence.

In one example, a statistical function can be able to predict with 95% confidence that 3% of all samples in a set of 5000 samples will deviate from a mean of the sample set by more than two standard deviations. But the same function, all other things equal, can be able to predict with only 35% confidence that 3% of all samples in a set of 150 samples will deviate from the mean by more than two standard deviations.

In one embodiment, in step 201, the one or more processors can set an initial sample size to an arbitrary value or as a function of an educated guess based on expert knowledge of a business or other entity associated with the storage device. In some embodiments, the initial sample size can be identified automatically as a function of parameters related to an operation of the storage device or of associated hardware components or software.

In one example, an initial sample size can be set to a value of 100 samples per twelve-hour sampling interval in response to an observation that an amount of available storage of the storage device has changed very slowly, has varied within a narrow range, and has not been subject to abrupt swings in the recent past. In another example, an initial sample size can be set to a value of 3600 samples per one-hour sampling interval when it a storage device has been observed to be subject to unexpected periods of high utilization.

This initial sample size can be a further function of an expert's knowledge of a "long-term prediction time" L and of a "short-term prediction time" S. These times identify a maximum acceptable time to respond to a detection of, respectively, a less-imminent and a more-imminent overutilization condition.

In one embodiment, one or more processors can monitor utilization of a company's mission-critical server array. Based on the company's priorities and availability of resources, a long-term prediction time L can be set to twenty-four hours and a short-term prediction time S can be set to ten minutes. If the processors report a probability that the available storage capacity of the server array will drop below 30%, the long-term prediction time indicates that the business requires that the problem must be addressed within the next twenty-four hours. If the processors report a probability that the available storage capacity of the server array will drop so low that they will cease to operate, then the short-term prediction time indicates that the business requires that this more urgent problem must be addressed within the next ten minutes.

In some embodiments, an initial sample size and an interval can be selected as a further function of L or S, in order to ensure a higher likelihood that the one or more processors is able to report a probability of overutilization quickly enough to allow remedial action to be taken within the L or S thresholds.

In step 203, the one or more processors capture an initial sample set, wherein each sample of the sample set identifies an amount of the device's available storage at the time the sample is identified. In embodiments that monitor a limited-capacity entity other than a storage device, each sample can similarly identify an amount of utilization of the monitored parameter of the monitored entity at the time of the sampling.

These samples can be obtained by any means known in the art, such as a system-maintenance utility, a network-management console, a software application written specifically for this purpose, a database-logging mechanism, a manual reading of a fuel gauge, or an other monitoring mechanism.

In some embodiments, each sampling event can capture and record one sampled piece of data (that is, one identification of an amount of available storage capacity of an other monitored parameter). In some embodiments, each sampling event may retrieve a set of such samples that have been accumulated and stored, such as a portion of a stored log file, since the last sampling event.

At the conclusion of step 203, the one or more processors will have accumulated an initial sample set that contains the number of samples identified in step 201 as the initial sample size.

In step 205, the one or more processors, using statistical methods known to those skilled in the art, derive an initial mean and initial deviation of the samples comprised by the initial sample set.

For example, if the initial sample set comprises n distinct samples $s_i$, then the initial mean μ is derived as an average value of n samples:

$$\mu = \left(\sum_{i=1}^{n} s_i\right) / n$$

Similarly the initial standard deviation λ of such a sample set would be derived by the formula (the square root of the variance of the sample set, wherein the variance equals a sum of the squares of each sample $s_i$'s deviation from the mean $(\mu - s_i)$, divided by the sample size n):

$$\lambda = SQRT\left(\sum_{i=1}^{n} (\mu - s_i)^2 / n\right)$$

Step 207 initiates an iterative procedure of steps 207-215 that, in some embodiments, can continue indefinitely. Each iteration of this iterative procedure performs a statistical analysis of one or more previously collected sample sets, performs any corrective action needed to prevent or mitigate an overutilization condition predicted by the analysis, adjusts the sample size if necessary, and then captures a next set of samples.

In some embodiments, this iterative procedure acts as a real-time or near real-time feedback mechanism that continuously self-adjusts the sample size to ensure that the sample size is most likely to be optimal, wherein this self-adjusting is performed as a function of results identified or inferred by the statistical analysis of the most recent sample set.

In the first iteration of the procedure of step 207-215, the one or more processors in step 207 derive a Chi-square statistic $\chi^2$ by means of an analysis of the initial sample set captured in step 203. In subsequent iterations, the one or more processors in step 207 perform a Chi-squared analysis of a subsequent sample set captured in step 215.

This analysis comprises an evaluation of the formula:

$$\chi^2 = \sum_n^{i=1} \frac{(s_i - \mu)^2}{\mu} < \alpha$$

which performs a statistical function on the sample set under consideration and compares the resulting Chi-square statistic to a desired confidence threshold $\alpha$.

In one example, the one or more processors in step 205 can have identified that a sample set comprising 1000 samples $s_i$ has a mean value $\mu$ of 72% (or 0.72). The processors compute a deviation from the mean $(s_i - \mu)$ for each of the 1000 samples, square the value of that deviation, and then divide the resulting squared value by $\mu$. If, for example, the 100th sample $s_{100}$ has a value of 0.62, this computation would yield a value equal to:

(0.62−0.72)²/0.72=
(−0.10)²/0.72=
0.001/0.72=
0.014.

The sum of the 1000 resulting values derived in this manner is then compared against a confidence-threshold value $\alpha$ of 95% (or 0.95). The sum of the 1000 resulting values derived in this manner is then compared against a confidence-threshold value $\alpha$ of 95% (or 0.95). If the Chi-square statistic represented by the sum is greater than the confidence-threshold value of 0.95, then deriving the mean and standard deviations from this sample set is meaningful because enough samples were collection to have statistical significance. In some embodiments, that acceptable range will be within one standard deviation of the mean value $\mu$. In other embodiments, an other value of $\alpha$ or an other acceptable range of values can be selected as a function of implementation-dependent factors. These factors can comprise, but are not limited to, a characteristic of the entity being monitored, a characteristic of an other physical or software entity, or a characteristic of a goal of a business that manages the entity.

In some cases, different sample sets can be associated with different minimum sample sizes. A sample set that, for example, comprises samples associated with a higher standard deviation can require a greater number of samples in order to allow the production of statistically meaningful results.

At the conclusion of step 207, the one or more processors will have derived a mean and a standard deviation of a sample set, will have tested those derived values by performing a Chi-square test on the samples of the sample set, and will have determined from a result of the Chi-square test whether the size of the sample set is sufficient to produce statistically meaningful results in later steps of the method of FIG. 2. If the test of step 207 determines that the sample size falls below such a threshold, it will not be possible to use the mean and standard deviation of the collected sample set to accurately forecast resource usage in later steps of the method of FIG. 2.

In step 209, if the Chi-square test of step 207 determined that the sample set last collected during a performance of step 203 or 215 is capable of producing statistically meaningful results, the one or more processors try to identify a likelihood that an undesired condition will occur. If such a likelihood exceeds an implementation-dependent threshold, the processors then determine a type of corrective action to perform in order to prevent or mitigate the undesired condition and branch to step 211 in order to perform such corrective action.

The one or more processors can further determine in step 209 whether the sample size of the last-collected sample set should be adjusted before the next sample set is collected in the next iteration of step 215. During the first iteration of the iterative procedure of steps 207-215, the last-collected sample set will have been collected in step 203. In subsequent iterations, the one or more processors will have collected the last-collected sample set in a prior iteration of step 213.

If the Chi-square test of step 207 determined that the sample size of the last-collected sample set was not sufficient to produce statistically significant results, the one or more processors in this step will by default identify a need to adjust the sample size of the next-collected sample set in order to increase the likelihood that the next sample set will be able to produce statistically significant results.

In some embodiments, a corrective action can be required if the determination of step 209 reveals a likelihood that an overutilization condition will occur within the long-term prediction time L, a likelihood that an overutilization condition will occur within the short-term prediction time S, a currently existing overutilization condition, or an other condition, event, or likelihood of such a condition or event that is relevant to the proper operation of the monitored entity.

A corrective action can comprise communicating an alert to a system administrator, IT professional, other user, software application, or other responsible entity. In other cases, a corrective action can comprise adjusting the sample size of the next sample set to be collected, in order to increase the likelihood that the next sample set will produce statistically significant results. In yet other cases, a correction action can comprise other types of diagnostic, reporting, or prognostic actions, or a combination thereof.

If the one or more processors in step 209 determine both that no corrective action need be taken and that the current sample size should continue to be used for the next-collected sample set, then the method of FIG. 2 skips step 211 and continues with step 213.

Figure 3:
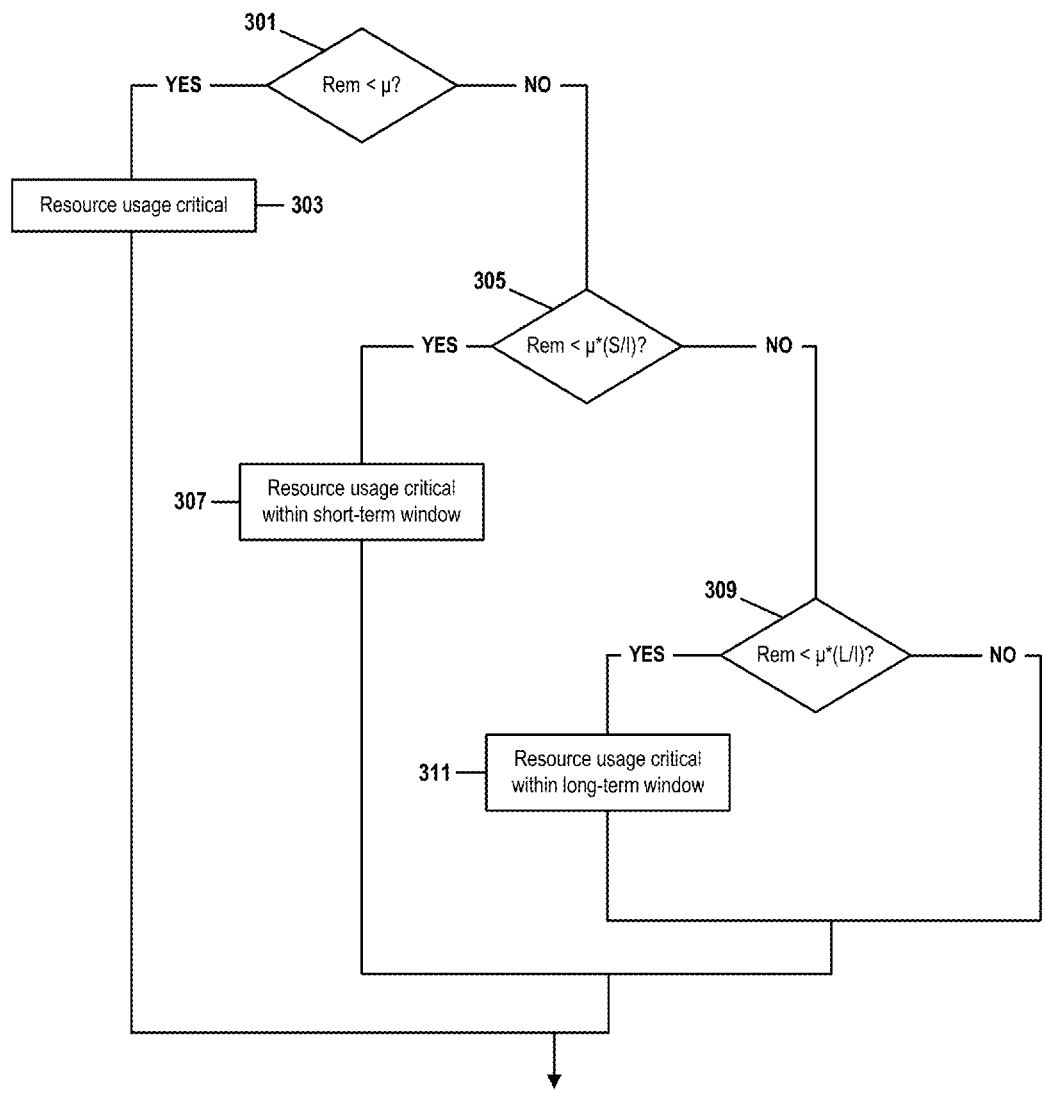
FIG. 3 is a flow chart that illustrates computational details of a method for a resource-utilization monitor with self-adjusting sample size in accordance with embodiments of the present invention.

FIG. 3 illustrates these procedures of step 209 in greater detail.

Step 211 is performed if the one or more processors in step 209 identify a need to adjust the current sample size or to take corrective action, as described above, in response to the results of the Chi-square test of step 207 or of the determination of step 209. If the one or more processors identify such a need in step 209, the one or more processors here adjust the sample size or take steps to implement the corrective action identified in step 209. FIG. 3 describes these procedures in greater detail.

If the one or more processors in step 211 adjust the current sample size, an adjusted value of the sample size can be determined by any means known to those skilled in the art of information technology or related fields, or derived by a person with expert knowledge of the monitored entity or of a monitoring entity. In cases where the one or more processors determined in step 207 that the current sample size was too small to allow the previous sample set to yield statistically valid results, the sample size can be adjusted upward by a predetermined amount or percent. In other embodiments, more complex mathematical methods can be used to determine an amount or a direction of adjustment. In yet other embodiments, an adjustment can be made by a fixed, predetermined, or arbitrary trial-and-error amount.

In step 213, the one or more processors collect the next sample set by a means similar to that of step 203. If step 211 adjusted the sample size during the current iteration of the procedure of steps 207-215, the sample set collected during this current iteration of step 213 can be associated with this adjusted sample size.

In step 215, the one or more processors compute a mean and standard deviation of the sample set most recently collected during an iteration of step 213. The computing is performed by means similar to those of step 205.

The conclusion of step 215 completes the current iteration of the iterative procedure of steps 207-215. At this point, the one or more processors will have collected a next sample set, possibly using an adjusted sample size, and will have computed mean and standard deviation statistics necessary to perform a Chi-square analysis, sample-rate adjustment, or corrective-action determination, as described above. These tasks will be performed during the next iteration of the iterative procedure of steps 207-215.

In some embodiments, the one or more processors will continue to perform this iterative procedure, continuously adjusting a sample size of each collected sample set as a function of characteristics of one or more previously collected sample sets, and determining a likelihood of an overutilization condition or other undesirable condition by interpreting results of a statistical analysis performed on the most current sample set.

FIG. 3 is a flow chart that illustrates steps 209 and 211 of FIG. 2 in greater detail, a method for resource-utilization monitor with self-adjusting sample size in accordance with embodiments of the present invention. FIG. 3 contains steps 301-311.

The steps of FIG. 3 evaluate parameters or factors described above that comprise:
- I: A sample-collection interval that identifies a duration of time between analyses of the most recently collected sample set by means of a method of FIG. 3.
- L: A long-term prediction time, set by a user or system designer based on expert knowledge of the monitored entity or of a business or other entity associated with the monitored entity. L identifies a maximum acceptable duration of time for the business or other associated entity to respond to a moderately severe error condition.
- S: A short-term prediction time, set by a user or system designer based on expert knowledge of the monitored entity or of a business or other entity associated with the monitored entity. S identifies a maximum acceptable duration of time for the business or other associated entity to respond to a more severe error condition.
- Rem: A remaining amount of available resource of the entity being monitored. If, for example, an embodiment of the present invention monitors an amount of available storage space of a hard disk drive, a value of Rem indicates how much storage is currently available on that disk drive.
- $\mu$: The mean value of the set of samples most recently collected, as derived by the one or more processors in step 205 or 215. Here, this mean value represents an amount of the available resource that was consumed during the prior sample-collection interval I.

In step 301, the one or more processors determine whether Rem, the amount of available resource, is less than $\mu$, the average amount of resource used during a sampling interval I, within a confidence threshold represented by $\alpha$ during the Chi-square computation of step 207. If Rem is less than $\mu$, then there is a probability at least equal to the value of $\alpha$ that the resource will be completely depleted during the next interval I.

Step 303 is performed if the one or more processors determine in step 301 that Rem is less than $\mu$. Here, the one or more processors would then take immediate corrective action. This action can, depending on characteristics of the embodiment, of the entity being monitored, or of a business, user, or other entity associated with the monitored entity, comprise steps such as communicating an alert to a responsible entity that the monitored device is about to enter a critical state that demands immediate attention In other embodiments, the one or more processors can react by fully or partially automated means that can comprise, but is not limited to, reconfiguring hardware or software, adjusting a network topology, configuring the monitored entity to be all or partly unavailable, or taking steps to reduce a demand on the monitored entity.

Step 305 is performed if the one or more processors determine in step 301 that Rem is not less than $\mu$. In step 305, the one or more processors determine whether Rem, the amount of available resource, is less than $\mu$, weighted by the value S/I. Here, the ratio S/I represents a number of intervals comprised by a value of the short-term prediction time. Expressed another way, S/I represents a number of sampling intervals I during which a response must be made to a detection of an imminent overutilization condition. Here, as described above, I represents the period of time between performances of the analytical method of FIG. 3.

If, for example, S/I represents a period of time equivalent to three sampling intervals, a current value of Rem that is less than $\mu$*S/I identifies that, with a probability identified by the confidence threshold $\alpha$, Rem will be depleted, or will fall to an otherwise-critical level, within a time equivalent to three sampling intervals.

Step 307 is performed if the one or more processors determine in step 305 that Rem is less than $\mu$*S/I. Here, the one or more processors would take corrective action that can comprise, depending on characteristics of the embodiment, of the entity being monitored, or of a business, user, or other entity associated with the monitored entity, steps such as communicating an urgent warning to a responsible entity that the monitored device is about to enter a critical state that demands immediate attention. In other embodiments, the one or more processors can react by fully or partially automated means that can comprise, but is not limited to, adjusting a network topology, configuring the monitored entity to be all or partly unavailable, or requesting authorization to reduce a demand on the monitored entity.

Step 309 is performed if the one or more processors determine in step 305 that Rem is not less than $\mu$*S/I. In step 309, the one or more processors determine whether Rem, the amount of available resource, is less than $\mu$, weighted by the value L/I. Here, the ratio L/I represents a number of intervals comprised by a value of the long-term prediction time. Expressed another way, L/I represents a number of sampling intervals I during which a response must be made to a detection of a less-imminent overutilization condition.

If, for example, L/I represents a period of time equivalent to twenty sampling intervals, a current value of Rem that is less than $\mu$*L/I identifies that, with a probability identified by the confidence threshold α, Rem will be depleted, or will fall to an otherwise-critical level, within a time equivalent to twenty sampling intervals.

Step 311 is performed if the one or more processors determine in step 305 that Rem is less than μ*L/I. Here, the one or more processors would take corrective action that can, depending on characteristics of the embodiment, of the entity being monitored, or of a business, user, or other entity associated with the monitored entity, comprise steps such as communicating a preliminary warning to a responsible entity that the monitored device is likely to enter a critical state that will require a remedial action be undertaken within a specified window of time In other embodiments, the one or more processors can react by fully or partially automated means that can comprise, but is not limited to, to advising a user or administrator of a need to adjust a network topology, reconfigure the monitored entity to be all or partly unavailable, or to otherwise reduce a demand on the monitored entity.

The exact types of corrective actions performed by the one or more processors in step 303, 307, or 311 can be implementation-dependent or can be determined as a function of a requirement of the embodiment, of a characteristic of the monitored entity, of a requirement of a monitoring entity, or of other types of factor deemed relevant to the continued proper operation of the monitored entity.

What is claimed is:

1. A method for predicting, by a computerized storage-management system, a likelihood of a critical storage problem, the method comprising:
    a processor of a computerized storage controller of the computerized storage-management system receiving a sample set, where a sample size identifies a number of samples in the sample set, and where a first sample of the sample set identifies a first amount of storage space that was available to a storage device at a time when the first sample was recorded;
    the processor deriving a mean of the sample set and a standard deviation of the sample set;
    the processor further deriving a Chi-square statistic of the sample set as a function of the first mean and the first standard deviation, where the Chi-square statistic identifies whether the sample size is large enough to ensure that the sample set is statistically valid;
    the processor, as a function of the deriving and of the further deriving, determining whether the sample set is statistically valid;
    the processor, as a function of the determining, identifying a likelihood of a critical storage problem occurring within a threshold time;
    the processor, as a further function of the determining, directing the computerized storage-management system to select an adjusted sample-set size,
        where the duration of the threshold time is selected to allow the processor to perform the identifying in real time, and
        where the adjusted sample-set size identifies a size of a future sample set that the computerized storage controller will request and receive at a future time in order to identify available a future available storage space of the storage device at the future time.

2. The method of claim 1, where the communicating further comprises:
    the processor performing a statistical analysis of the sample set that indicates a likelihood that the amount of storage space available to the storage device will reach a critical level at or before the threshold time,
        where the threshold time is selected from a group consisting of: a time at which the performing occurs, a short-term prediction time that occurs after the performing, and a long-term prediction time that occurs after the short-term prediction time, and
        where the critical level identifies a minimum desired amount of storage space available to the storage device.

3. The method of claim 1, where the determining determines that the sample set is not statistically valid, the method further comprising:
    the processor adjusting the sample size; and
    the processor repeating the receiving and determining before performing the statistical analysis.

4. The method of claim 3,
    where a desired confidence threshold of the sample set identifies a desired minimum probability that a value of a second sample recorded at a future time will fall within an acceptable range of values,
    where the acceptable range of values is a function of the mean and the standard deviation, and
    where the sample size is large enough to ensure that the sample set is statistically valid only if the Chi-square statistic is greater than or equal to the desired confidence threshold.

5. The method of claim 3, where the determining determines that the sample set is statistically valid, the method further comprising:
    the processor further determining that the amount of storage space available to the storage device is less than the mean; and
    the processor, in response to the further determining, identifying that an amount of storage space available to the storage device is at the critical level.

6. The method of claim 3, where the determining determines that the sample set is statistically valid, the method further comprising:
    the processor further determining that the amount of storage space available to the storage device is less than the product of the first mean and the short-term prediction time; and
    the processor, in response to the further determining, identifying a likelihood that an amount of storage space available to the storage device will reach the critical level before the short-term prediction time.

7. The method of claim 3, where the determining determines that the sample set is statistically valid, the method further comprising:
    the processor further determining that the amount of storage space available to the storage device is less than the product of the first mean and the long-term prediction time; and
    the processor, in response to the further determining, identifying a likelihood that an amount of storage space available to the storage device will reach the critical level within the long-term prediction time.

8. The method of claim 3, where the sequence of steps of receiving, determining, and performing is repeated continuously.

9. The method of claim 1, further comprising providing at least one support service for at least one of creating, integrating, hosting, maintaining, and deploying computer-readable program code in the computer system, where the computer-readable program code in combination with the computer system is configured to implement the receiving, the deriving, the further deriving, the determining, the identifying, and the directing.

10. A computer program product, comprising a computer-readable hardware storage device having a computer-readable program code stored therein, said program code configured to be executed by a processor of a computerized storage-management system to implement a method for predicting, by the computerized storage-management system, a likelihood of a critical storage problem, the method comprising:
  a computerized storage controller of the computerized storage-management system requesting and receiving a sample set, where a sample size identifies a number of samples in the sample set, and where a first sample of the sample set identifies a first amount of storage space that was available to a storage device at a time when the first sample was recorded;
  the controller deriving a mean of the sample set and a standard deviation of the sample set;
  the controller further deriving a Chi-square statistic of the sample set as a function of the first mean and the first standard deviation, where the Chi-square statistic identifies whether the sample size is large enough to ensure that the sample set is statistically valid;
  the controller, as a function of the deriving and of the further deriving, determining whether the sample set is statistically valid;
  the controller, as a function of the determining, identifying a likelihood of a critical storage problem occurring within a threshold time;
  the controller, as a further function of the determining, directing the computerized storage-management system to select an adjusted sample-set size,
    where the duration of the threshold time is selected to allow the controller to perform the directing in real time, and
    where the adjusted sample-set size identifies a size of a future sample set that the computerized storage controller will request and receive at a future time in order to identify available a future available storage space of the storage device at the future time.

11. The computer program product of claim 10, where the communicating further comprises:
  the processor performing a statistical analysis of the sample set that indicates a likelihood that the amount of storage space available to the storage device will reach a critical level at or before the threshold time,
    where the threshold time is selected from a group consisting of: a time at which the performing occurs, a short-term prediction time that occurs after the performing, and a long-term prediction time that occurs after the short-term prediction time, and
    where the critical level identifies a minimum desired amount of storage space available to the storage device.

12. The computer program product of claim 10, where the determining determines that the sample set is not statistically valid, the method further comprising:
  the processor adjusting the sample size; and
  the processor repeating the receiving and determining before performing the statistical analysis.

13. The computer program product of claim 12,
  where a desired confidence threshold of the sample set identifies a desired minimum probability that a value of a second sample recorded at a future time will fall within an acceptable range of values,
  where the acceptable range of values is a function of the mean and the standard deviation, and
  where the sample size is large enough to ensure that the sample set is statistically valid only if the Chi-square statistic is greater than or equal to the desired confidence threshold.

14. The computer program product of claim 12, where the determining determines that the sample set is statistically valid, the method further comprising:
  the processor further determining that the amount of storage space available to the storage device is less than the mean; and
  the processor, in response to the further determining, identifying that an amount of storage space available to the storage device is at the critical level.

15. The computer program product of claim 12, where the determining determines that the sample set is statistically valid, the method further comprising:
  the processor further determining that the amount of storage space available to the storage device is less than the product of the first mean and the short-term prediction time; and
  the processor, in response to the further determining, identifying a likelihood that an amount of storage space available to the storage device will reach the critical level before the short-term prediction time.

16. The computer program product of claim 12, where the determining determines that the sample set is statistically valid, the method further comprising:
  the processor further determining that the amount of storage space available to the storage device is less than the product of the first mean and the long-term prediction time; and
  the processor, in response to the further determining, identifying a likelihood that an amount of storage space available to the storage device will reach the critical level within the long-term prediction time.

17. A computerized storage-management system comprising a processor of a computerized storage controller, a memory coupled to said processor, and a computer-readable hardware storage device coupled to said processor, said storage device containing program code configured to be run by said processor via the memory to implement a method for predicting a likelihood of a critical storage problem, the method comprising:
  the processor receiving a sample set, where a sample size identifies a number of samples in the sample set, and where a first sample of the sample set identifies a first amount of storage space that was available to a storage device at a time when the first sample was recorded;
  the processor deriving a mean of the sample set and a standard deviation of the sample set;
  the processor further deriving a Chi-square statistic of the sample set as a function of the first mean and the first standard deviation, where the Chi-square statistic identifies whether the sample size is large enough to ensure that the sample set is statistically valid;
  the processor, as a function of the deriving and of the further deriving, determining whether the sample set is statistically valid;
    the processor, as a function of the determining, identifying a likelihood of a critical storage problem occurring within a threshold time;
  the processor, as a further function of the determining, directing the computerized storage-management system to select an adjusted sample-set size,
    where the duration of the threshold time is selected to allow the processor to perform the identifying in real time, and where the adjusted sample-set size identifies a size of a future sample set that the computerized storage controller will request and receive at a future time in order to identify available a future available storage space of the storage device at the future time.

18. The computer system of claim 17, where the communicating further comprises:

the processor performing a statistical analysis of the sample set that indicates a likelihood that the amount of storage space available to the storage device will reach a critical level at or before the threshold time, where the threshold time is selected from a group consisting of: a time at which the performing occurs, a short-term prediction time that occurs after the performing, and a long-term prediction time that occurs after the short-term prediction time, and where the critical level identifies a minimum desired amount of storage space available to the storage device.

19. The computer system of claim 17, where the determining determines that the sample set is not statistically valid, the method further comprising:

the processor adjusting the sample size; and the processor repeating the receiving and determining before performing the statistical analysis.

20. The computer system of claim 19, where the determining determines that the sample set is statistically valid, the method further comprising:

the processor further determining that the amount of storage space available to the storage device is less than the mean; and the processor, in response to the further determining, identifying that an amount of storage space available to the storage device is at the critical level.

21. The computer system of claim 19, where the determining determines that the sample set is statistically valid, the method further comprising:

the processor further determining that the amount of storage space available to the storage device is less than the product of the first mean and the short-term prediction time; and the processor, in response to the further determining, identifying a likelihood that an amount of storage space available to the storage device will reach the critical level before the short-term prediction time.

22. The computer program product of claim 19, where the determining determines that the sample set is statistically valid, the method further comprising:

the processor further determining that the amount of storage space available to the storage device is less than the product of the first mean and the long-term prediction time; and the processor, in response to the further determining, identifying a likelihood that an amount of storage space available to the storage device will reach the critical level within the long-term prediction time.

* * * * *